United States Patent [19]

Sugihara et al.

[11] Patent Number: 5,695,288

[45] Date of Patent: Dec. 9, 1997

[54] LINEAR MOTION ROLLING BEARING OF THE ROLLING BEARING WITH LUBRICANT INSERTION HOLES IN END SEALS

[75] Inventors: Sadato Sugihara, Milton Keynes; Tsutomu Togashi, Central Milton Keynes, both of United Kingdom

[73] Assignee: Nippon Thompson Co., Ltd., Tokyo, Japan

[21] Appl. No.: 731,492

[22] Filed: Oct. 16, 1996

[30] Foreign Application Priority Data

Oct. 20, 1995 [JP] Japan ............................ 7-297736

[51] Int. Cl.6 ..................... F16C 33/10; F16C 29/06
[52] U.S. Cl. ..................... 384/13; 384/16; 384/44; 384/45
[58] Field of Search ..................... 384/43, 44, 45, 384/13, 16

[56] References Cited

U.S. PATENT DOCUMENTS

| | | | |
|---|---|---|---|
| 5,429,439 | 7/1995 | Hsu et al. | 384/45 |
| 5,435,649 | 7/1995 | Kuwahara | 384/45 |
| 5,496,113 | 3/1996 | Winkelman et al. | 384/45 |
| 5,547,285 | 8/1996 | Hutzel et al. | 384/45 |
| 5,568,982 | 10/1996 | Stoll et al. | 384/45 |
| 5,582,068 | 12/1996 | Fukui | 384/45 |

Primary Examiner—Daniel P. Stodola
Assistant Examiner—Matthew A. Kaness
Attorney, Agent, or Firm—Sughrue, Mion, Zinn, Macpeak & Seas, PLLC

[57] ABSTRACT

A linear motion rolling bearing which, together with enabling lubricant to be supplied inexpensively and reliably, allows maintenance relating to the occurrence of lubricant clogging and so forth to be performed easily, while also enabling the supply of lubricant to be performed extremely simply even in the case of small products. Lubricant insertion holes are formed in end seals provided on the ends of an outer cylinder, and a lubricant such as grease is injected through the lubricant injection holes using an injector.

10 Claims, 7 Drawing Sheets

LINEAR MOTION ROLLING BEARING OF THE ROLLING BEARING WITH LUBRICANT INSERTION HOLES IN END SEALS

BACKGROUND OF THE INVENTION

1. Field of the Invention

The present invention relates to a linear motion rolling bearing in which rolling elements perform unending linear motion between a track shaft and outer cylinder using a circulating system within an outer cylinder, and a bearing apparatus in which said linear motion rolling bearing is incorporated in a bearing housing.

2. Description of the Prior Art

FIG. 1 shows a relatively large diameter (large) angular ball spline as one example of a linear motion rolling bearing of the prior art.

As shown in the drawing, said ball spline is equipped with a track shaft in the form of roughly circular column-shaped spline shaft 1, and cylindrical outer cylinder 2 fits onto said spline shaft 1. Six streaks of track grooves 1a are formed along the lengthwise direction in said spline shaft 1, and rolling element circulating paths are formed in outer cylinder 2 corresponding to each of said track grooves 1a. A large number of rolling elements in the form of balls 4 are arranged and contained in these rolling element circulating paths that circulate by rolling along the above-mentioned track grooves 1a accompanying relative motion of spline shaft 1 and outer cylinder 2.

The above-mentioned outer cylinder 2 has outer cylinder body 6, a pair of end caps 7 respectively formed into the shape of rings that are coupled to both ends of outer cylinder body 8 in a state in which they fit inside, and end seals 8 attached to the outsides of both said end caps 7 so as to seal the gaps between the above-mentioned spline shaft 1 and outer cylinder 2. However, the drawing only shows end cap 7 and end seal 8 on one side.

Furthermore, reference numeral 10 in the drawing indicates a snap ring.

The rolling element circulating paths mentioned above provided for each ball 4 to circulate are each composed of load bearing track groove 12 and return path 13, formed linearly and in parallel to each other in the above-mentioned outer cylinder body 6, and roughly semi-circular direction changing path 15 formed in end cap 7 that connects the corresponding ends of said load bearing path 12 and return path 13. Said load bearing path 12 opposes a track groove 1a of spline shaft 1.

As shown in the drawing, oil groove 6a is formed in the outside of the above-mentioned outer cylinder body 6 and in the center in the axial direction over the entire circumference of said outer cylinder body 6. Oil hole 6b is formed so as to connect this oil groove 6a and the above-mentioned return path 13.

In addition, key groove 6d is also formed in outer cylinder body 6.

Next, as a second example of the prior art, the following provides an explanation of a small diameter (small) radial ball spline based on FIG. 2.

As shown in the drawing, in said ball spline, each two streaks of corresponding track grooves 41a and rolling element circulating paths are formed in spline shaft 41 and outer cylinder 42, formed into the shape of a circular column and cylinder, respectively, which fit over and into each other. A large number of rolling elements in the form of balls 44 are arranged and contained within said rolling element circulating paths that circulate by rolling along the above-mentioned track grooves 41a accompanying relative movement of spline shaft 41 and outer cylinder 42.

The above-mentioned outer cylinder 42 has outer cylinder body 48, a pair of end caps 47 respectively formed into the shape of rings that are coupled to both ends of outer cylinder body 48 by screws 45, and end seals 48 fastened with both said end caps 47 to the outsides of said end caps 47 by said screws 45 so as to seal the gaps between the spline shaft 41 and outer cylinder 42.

The above-mentioned rolling element circulating paths are each composed of load bearing track groove 52 and return path 53, formed linearly and in parallel to each other in the above-mentioned outer cylinder body 48, and roughly semi-circular direction changing path 55 formed in end cap 47 that connects the corresponding ends of said load bearing path 52 and return path 53.

Furthermore, reference numeral 46d in the drawing indicates a key groove formed in outer cylinder body 46a.

The angular ball spline and radial ball spline shown in FIGS. 1 and 2, respectively, are preferably used in the mechanism portion that is to perform linear, relative motion while bearing a composite load, such as that consisting of a radial load and rotation torque, with a single shaft in various types of apparatuses such as industrial robots, transmissions, chip mounters, OA equipment and measuring instruments.

In recent years, due to the progress in automating each of the above-mentioned types of apparatuses, the usage frequency has increased for linear motion rolling bearings such as the above-mentioned ball spline as well, thus making their maintenance important. As one example of such maintenance, regular lubrication of the bearing is essential.

In the ball spline shown in FIG. 1, outer cylinder 2 as a stationary side is attached, for example, to bearing housing 18 as shown in FIG. 3. More specifically, outer cylinder body 6 fits inside retaining hole 18a formed in said bearing housing 18, and is prevented from coming out by snap rings 19. In addition, key groove 18b is formed along the axial direction of said retaining hole 18a, and key 20 is inserted into this key groove 18b and key groove 6d of outer cylinder body 6. In this attached state, the constitution for lubricating the ball spline is as described below.

Namely, oil hole 18d is formed in the above-mentioned bearing housing 18 so as to be connected with oil groove 6a formed in the above-mentioned outer cylinder body 6, and grease nipple 21 is attached to the end of the opening of said oil hole 18d. In other words, when a lubricant such as grease is injected through this grease nipple 21, it reaches the inside of outer cylinder body 6 after passing through oil hole 18d, oil groove 6a and oil hole 6b in that order, extending to each ball 4 and rolling element circulating path, and eventually reaching track grooves 1a of spline shaft 1.

In said constitution, since oil hole 18d for lubrication must also be formed in the above-mentioned bearing housing 18, there is the problem of increased forming costs.

In addition, oil hole 18d of bearing housing 18 and oil groove 6a of outer cylinder body 6 tend to easily become misaligned, and when they shift out of alignment, the supply efficiency of lubricant decreases resulting in the risk of clogging.

Moreover, although clogging can be caused by other factors, in that case, cleaning work to restore operation is not easy, involving, for example, removal of the ball spline from bearing housing 18 and in extreme cases, disassembly of all components.

On the other hand, although not shown in the drawings, the majority of the small ball splines shown in FIG. 2 are used by attaching to a bearing housing in the same manner as described above. Since oil grooves and oil holes are not usually provided in these small ball splines, lubrication is handled in the manner described below.

Namely, the ball spline is removed from the bearing housing, disassembled and refilled with lubricant after the time at which lubricant filled in advance is expected to dry up or deteriorate at the time of incorporating as a new component into each of the types of apparatuses described above such as an industrial robot is estimated, or when a problem with the lubrication state actually occurs.

SUMMARY OF THE INVENTION

In consideration of the above-mentioned problems of the prior art, the main object of the present invention is to provide a linear motion rolling bearing and bearing apparatus that incorporates said linear motion rolling bearing in a bearing housing which, together with enabling lubricant to be supplied inexpensively and reliably, allows maintenance relating to the occurrence of lubricant clogging and so forth to be performed easily, while also enabling the supply of lubricant to be performed extremely simply even in the case of small products.

In addition, in addition to each of the above-mentioned effects, another object of the present invention is to provide a linear motion rolling bearing that also demonstrates other effects.

In order to achieve the above-mentioned main object, the linear motion rolling bearing as claimed in the present invention is equipped with a track shaft in which tracks are formed along the lengthwise direction, an outer cylinder having rolling element circulating paths containing load bearing tracks corresponding to said track that fits onto said track shaft and is able to freely move relative to said track shaft, and a plurality of rolling elements arranged and contained in said rolling element circulating paths that circulate by rolling along said tracks accompanying relative movement of said track shaft and outer cylinder; wherein, lubricant injection holes are formed in end seals provided on both ends of said outer cylinder and which seal the gaps between said track shaft and outer cylinder.

In addition, in order to achieve the same main object of the present invention, the bearing apparatus as claimed in the present invention is equipped with a bearing housing, a track shaft in which tracks are formed along the lengthwise direction, an outer cylinder having rolling element circulating paths containing load bearing tracks corresponding to said tracks that is installed in a retaining hole provided in said bearing housing and fits onto said track shaft, and a plurality of rolling elements arranged and contained in said rolling element circulating paths that circulate by rolling along said tracks accompanying movement of said track shaft; wherein, lubricant injection holes are formed in end seals provided on both ends of said outer cylinder and which seal the gaps between said track shaft and outer cylinder.

According to the above-mentioned constitution, lubricant is supplied directly inside the outer cylinder through the above-mentioned lubricant injection holes.

DESCRIPTION OF THE PREFERRED EMBODIMENTS

The present invention is particularly useful when preferably embodying a small, two-track radial ball spline and the bearing apparatus on which it is equipped.

Next, the following provides an explanation of a bearing apparatus containing a radial ball spline as an embodiment of the present invention with reference to the attached drawings.

Furthermore, the ball spline of the present embodiment has a small diameter (is small in size).

Figure 1:
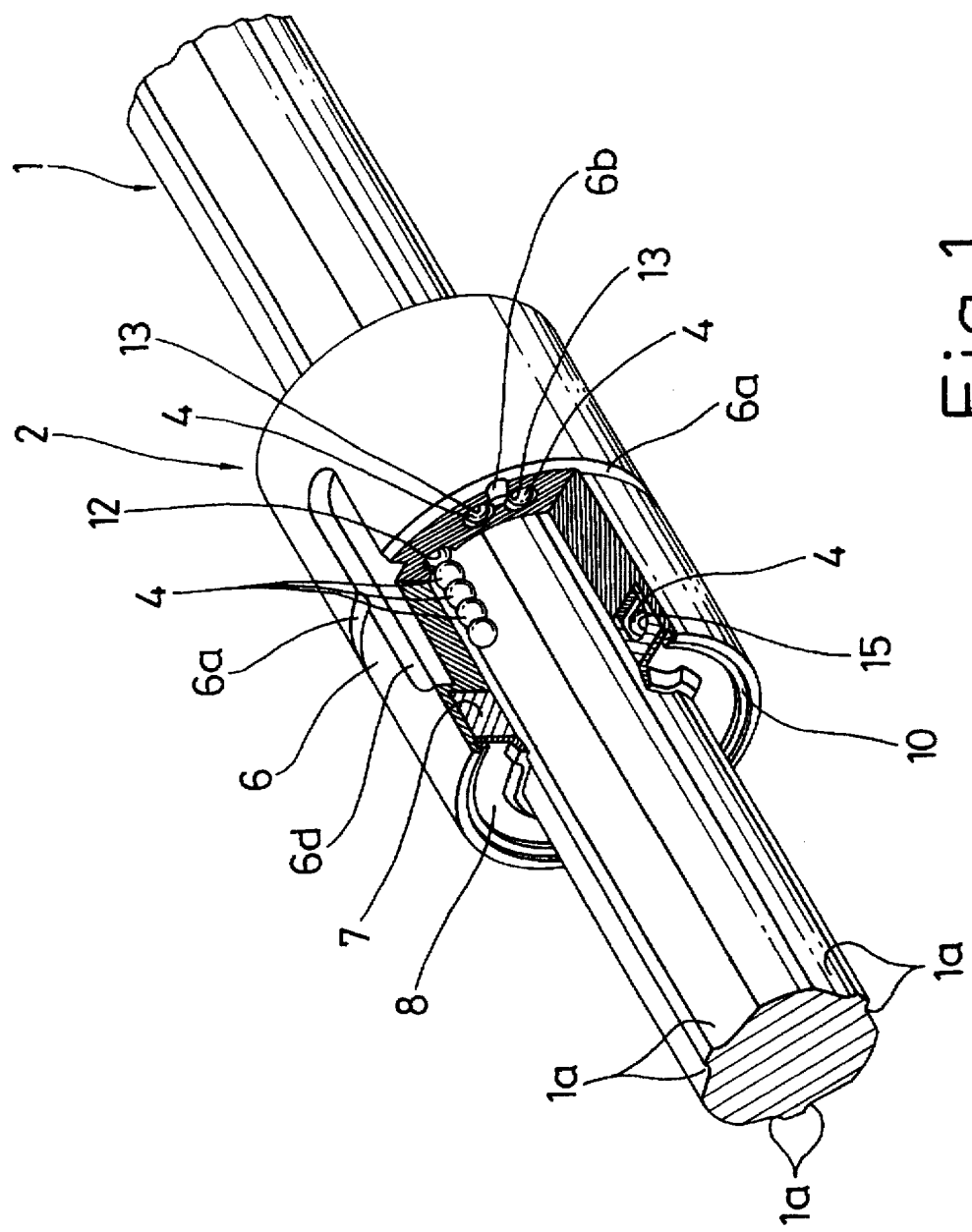
FIG. 1 is a perspective view, including a partial cross-section, showing the essential portion of a ball spline as a first example of the prior art.
Figure 2:
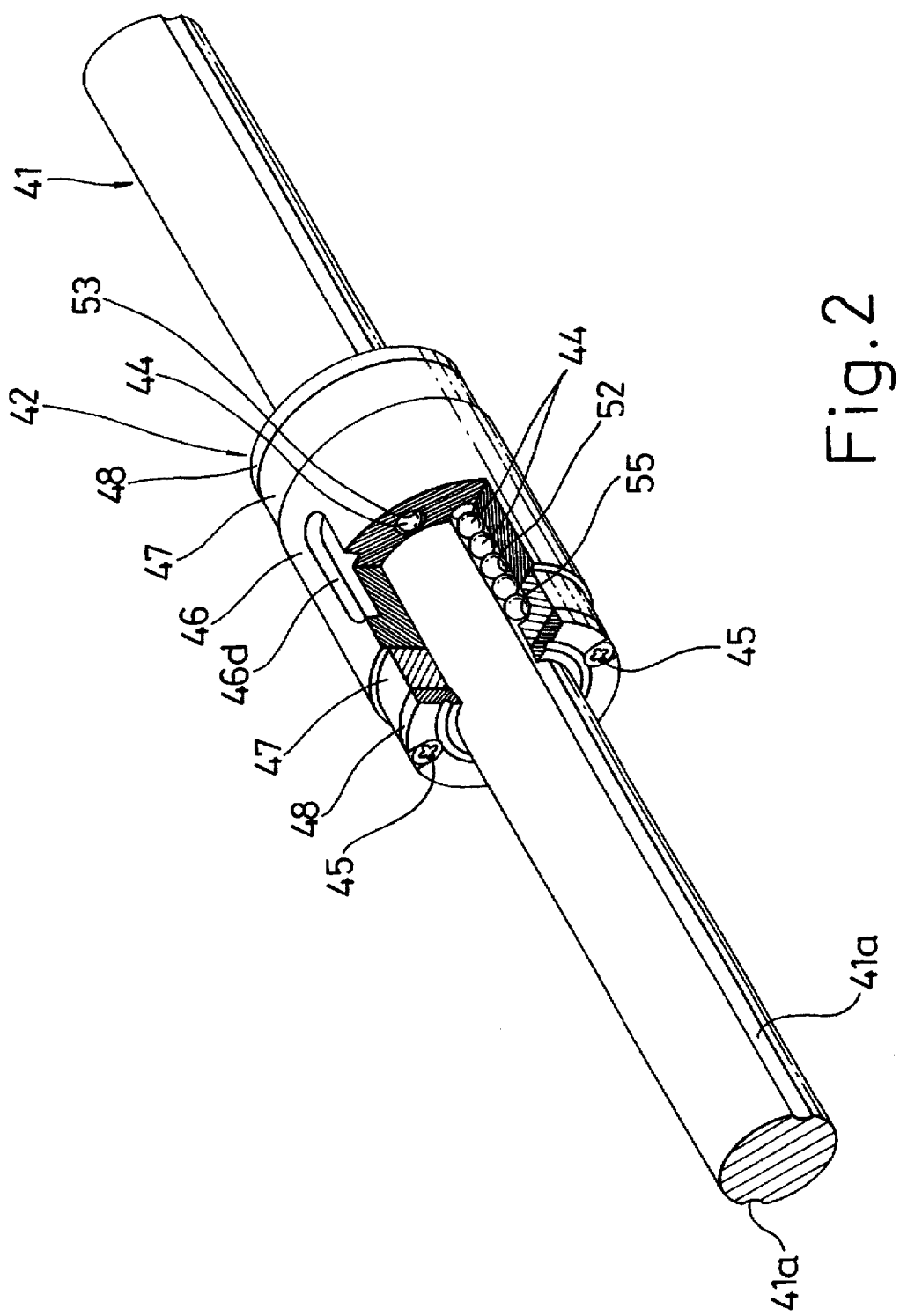
FIG. 2 is a perspective view, including a partial cross-section, showing the essential portion of a ball spline as a second example of the prior art.
Figure 3:
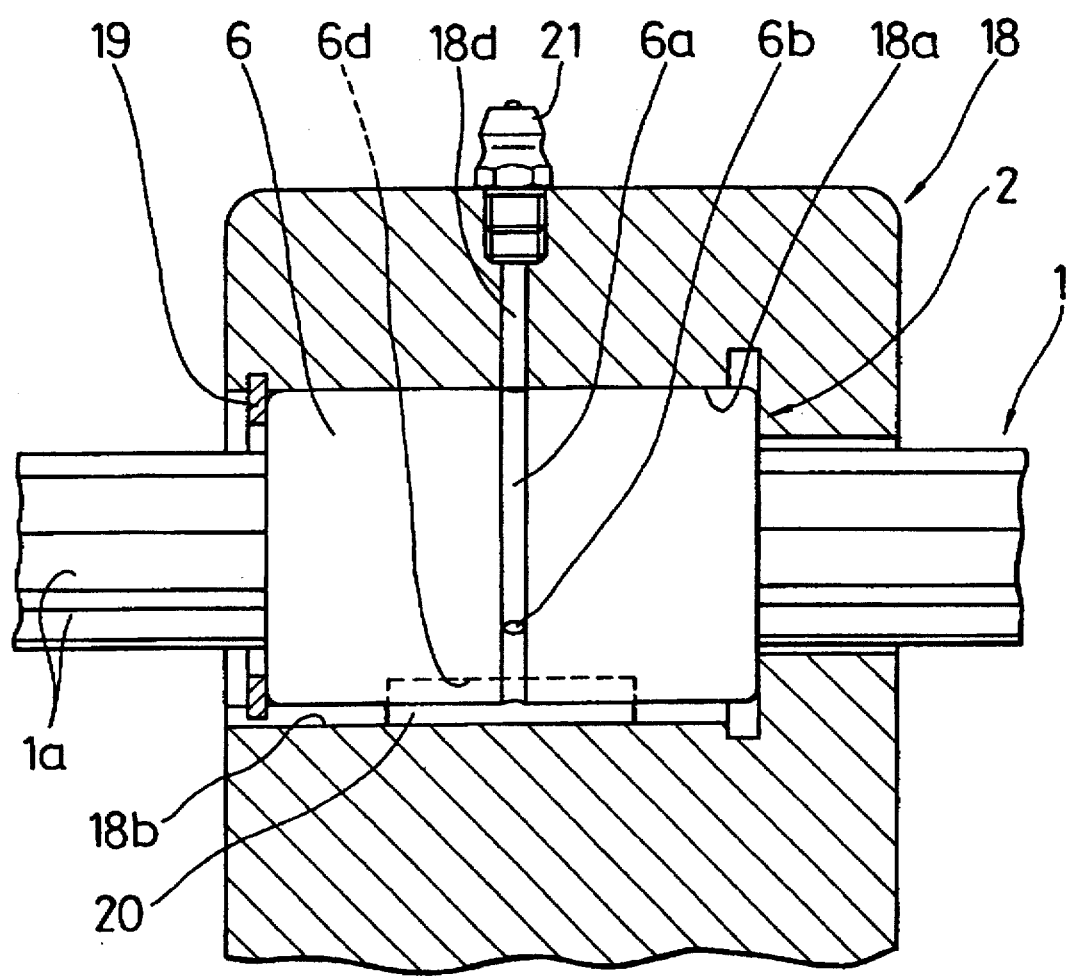
FIG. 3 is a front view, including a partial cross-section, showing the ball spline shown in FIG. 1 attached to a bearing housing.
Figure 4:
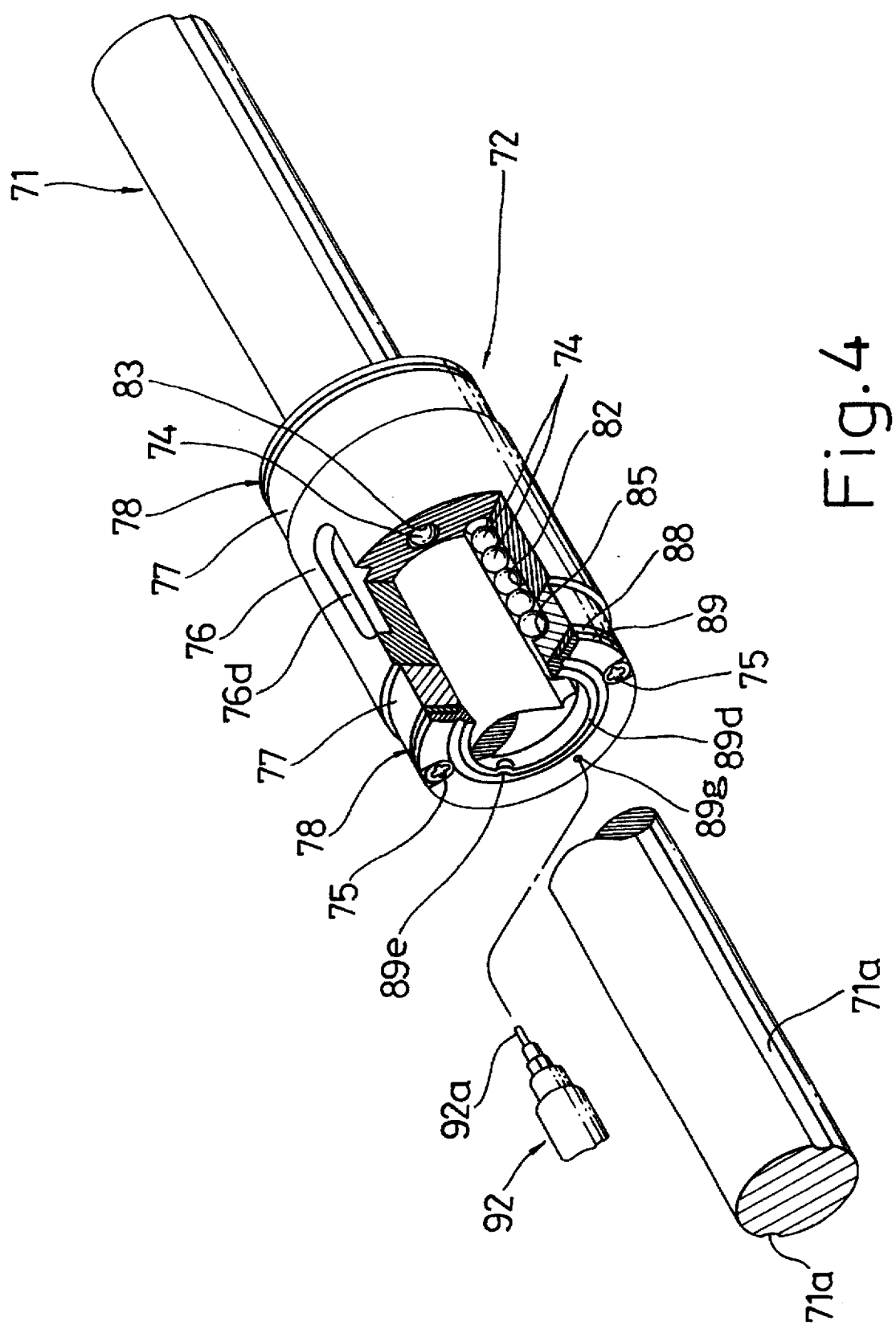
FIG. 4 is a perspective view, including a partial cross-section, of a radial ball spline as an embodiment of the present invention.

As shown in FIG. 4, the ball spline as claimed in the present invention is equipped with a track shaft in the form of spline shaft 71 roughly in the shape of a circular column, and cylindrical outer cylinder 72 fits onto said spline shaft 71. Two streaks of tracks in the form of track grooves 71a are formed along the lengthwise direction in said spline shaft 71, and rolling element circulating paths are formed in outer cylinder 72 corresponding to each said track grooves 71a. A large number of rolling elements in the form of balls 74 are arranged and contained in said rolling element circulating paths, said balls 74 circulating by rolling along the above-mentioned track grooves 71a accompanying relative movement of spline shaft 71 and outer cylinder 72.

The above-mentioned outer cylinder 72 has cylindrical outer cylinder body 78, a pair of end caps 77 each in the shape of a ring fastened to both ends of outer cylinder body 78 by two screws 75, and end seals 78 fastened with both said end caps 77 to the outside of said end caps 77 by said screws 75. Each end seal 78 seals the gap between spline shaft 71 and outer cylinder 72.

The above-mentioned rolling element circulating paths are composed of a load bearing track in the form of load bearing track groove 82 and return path 83 each formed linearly and mutually in parallel to each other in the above-mentioned outer cylinder body 78, and roughly semi-circular direction changing path 85 formed in end cap 77 that connects the corresponding ends of said load bearing track groove 82 and return path 83. Said load bearing track groove 82 is opposite to track grooves 71a in spline shaft 71.

Furthermore, reference numeral 76d in FIG. 4 indicates a key groove formed in outer cylinder body 76. Similar to the ball spline of the prior art previously described, said ball spline attaches outer cylinder 72 to a stationary side in the form of a bearing housing (not shown) and operates spline shaft 71. More specifically, outer cylinder body 76 is fit inside a retaining hole formed in said bearing housing. A key groove is formed along the axial direction of said retaining hole, and a key is inserted into this key groove and key groove 76d of outer cylinder body 76. Said ball spline and said bearing housing are generically referred to as a bearing apparatus.

Here, a detailed description is provided regarding the above-mentioned end cap 77 and end seal 78.

First, the following provides an explanation of end cap 77.

Figure 5:
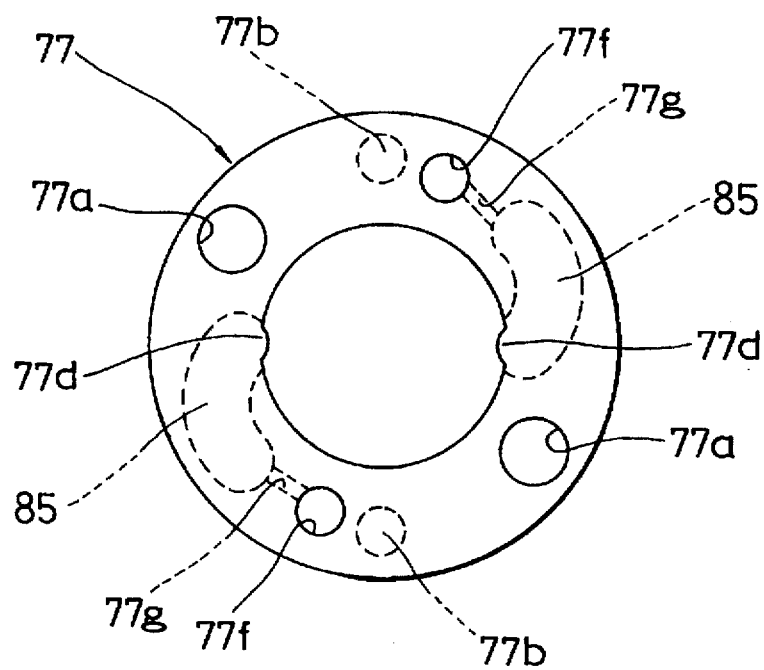
FIG. 5 is a front view of an end cap equipped on the ball spline shown in FIG. 4.
Figure 6:
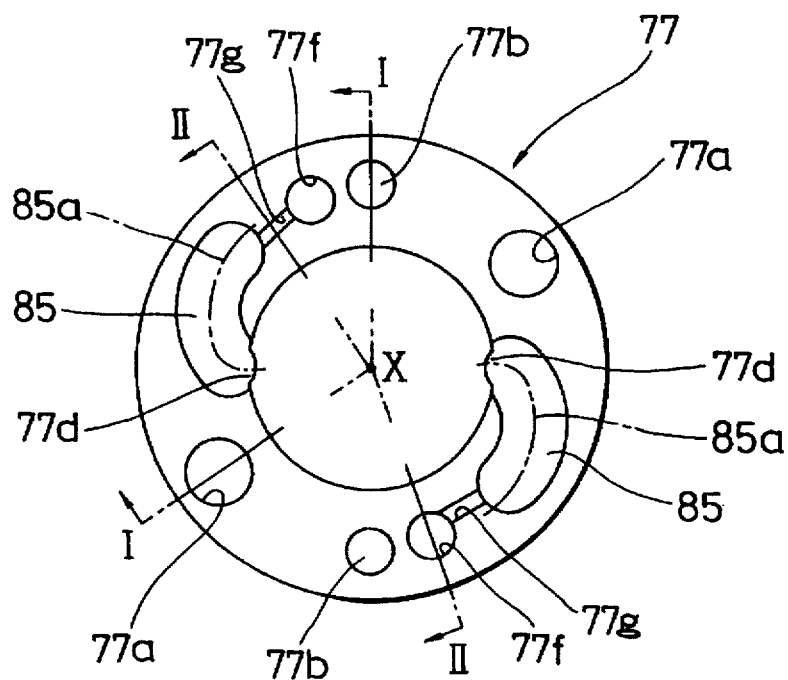
FIG. 6 is a rear view of the end cap shown in FIG. 5.
Figure 7:
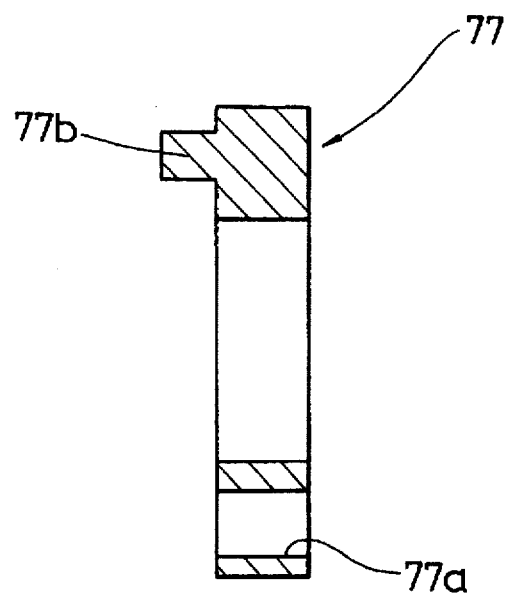
FIG. 7 is a cross-sectional view taken along lines I—X—I relating to FIG. 6.

As shown in FIGS. 5 through 7, two each of the previously described direction changing paths 85, attachment holes 77a in which the above-mentioned screws 75 are inserted, and circular column-shaped positioning projections 77b are formed in the symmetry to a dot in said end cap 77. Said positioning projections 77b are provided protruding from the inside of end cap 77, and fit into positioning holes (not shown) formed on the end of the above-mentioned outer cylinder body 78. As a result, the above-mentioned direction changing paths 85 are positioned with respect to the above-mentioned load bearing paths 82 and return paths 83.

Figure 8:
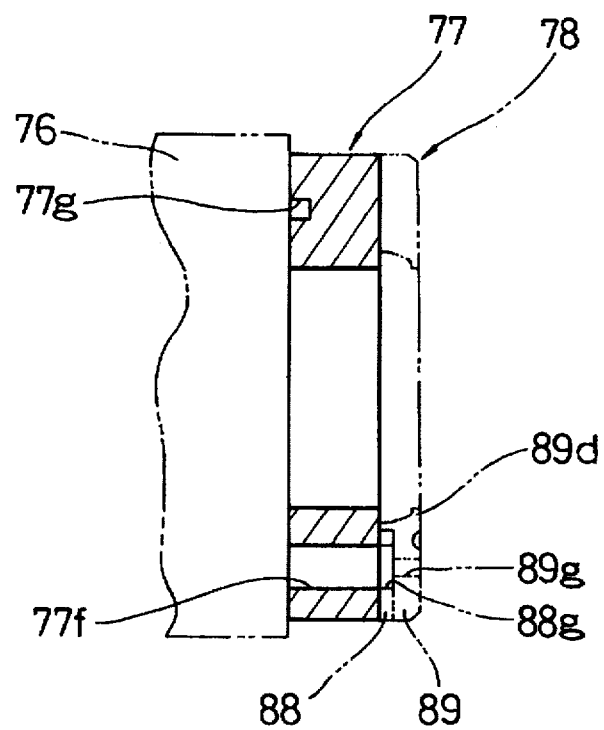
FIG. 8 is a cross-sectional view taken along lines II—X—II relating to FIG. 6.

In addition, as shown in FIG. 5 and 8, feed portions 77d, which feed balls 74 that have rolled along the above-mentioned load bearing track grooves 81 into the above-mentioned direction changing paths 85, are formed in end cap 77.

Moreover, as shown in FIGS. 5, 8 and 8, two each of holes 77f, which are formed in a circular shape that penetrate in the axial direction through said end cap 77, and grooves 77g, formed to have a rectangular cross-section that are continuous with said holes 77f on the inside of said end cap 77 and which extend roughly in the circumferential direction to be connected with the above-mentioned direction changing paths 85, are formed in end cap 77.

Next, the following provides a detailed description of end seal 78.

Figure 10:
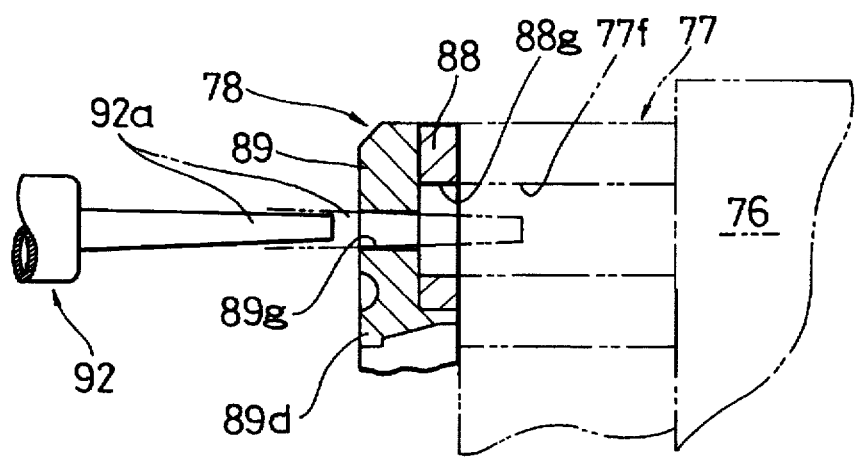
FIG. 10 is a view taken along arrows III—III relating to FIG. 9.

As shown in FIGS. 4, 8 and 10, this end seal 78 is composed of plate-shaped core member 88, formed into the shape of a ring and having high rigidity as a result of being made of a material such as metal or synthetic resin, and elastic member 89, made of rubber and so forth that is attached by baking, adhesive and so forth on the outside and inside of said core member 88, and makes sliding contact with spline shaft 71 (see FIG. 4).

Figure 9:
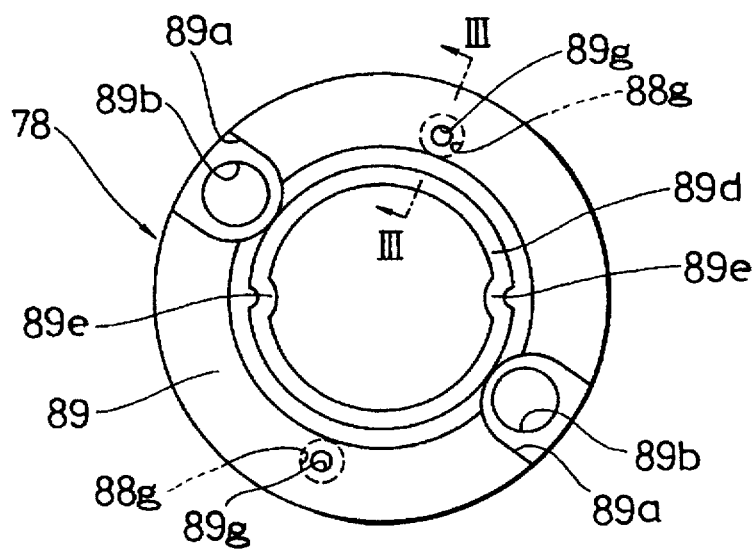
FIG. 9 is a front view of an end seal equipped on the ball spline shown in FIG. 4.

Furthermore, as shown in FIG. 9, countersunk portions 89a and insertion holes 89b, into which the head and neck portions of screws 75 shown in FIG. 4 are respectively inserted, are formed in the above-mentioned elastic member 89.

In addition, as shown in FIGS. 4 and 9, tongue pieces 89e, which make sliding contact with track grooves 71a formed in said spline shaft 71, are formed in lip portion 89d of elastic member 89, namely the portion that makes sliding contact with spline shaft 71.

As shown in FIGS. 4, 8, 9 and 10, lubricant injection holes 88g and 89g, which are formed to each have circular cross-sections, are concentrically formed in the above-mentioned core member 88 and elastic member 89, respectively. As shown in FIGS. 4 and 10, after making available syringe-like injector 92, nozzle 92a of said injector 92 is inserted into lubricant injection holes 88g and 89g to inject lubricant, for example, grease.

As shown in FIGS. 8 and 10, holes 77f formed in the above-mentioned end cap 77 are arranged so as to be connected with the above-mentioned lubricant injection holes 88g and 89g.

Namely, grease injected through lubricant injection holes 88g and 89g by the above-mentioned injector 92 is filled into holes 77f and eventually reaches direction changing paths 85 after passing through grooves 77g (shown in FIGS. 5, 8 and 8) connected with said holes 77f. As a result, an adequate amount of grease extends to rolling element circulating paths that contain said direction changing paths 85, each of balls 74 and eventually track grooves 71a of spline shaft 71.

As has been described above, lubricant injection holes 88g and 89g are formed in end seal 78 on the end of outer cylinder 72 in said ball spline. Thus, grease can be supplied directly from the end of outer cylinder 72 through said lubricant injections holes 88g and 89g. In the case of installing said ball spline on a bearing housing (not shown), there is no need whatsoever to form oil holes and so forth for supplying grease in said bearing housing, thus enabling costs to be held to a low level.

In addition, since grease is supplied directly in this manner, grease supply efficiency is high and there is little possibility of the occurrence of clogging resulting in reliable supply of grease. Even if clogging of grease was to occur, since it can be easily corrected simply by cleaning lubricant injection holes 88g and 89g, there is no need to entirely disassemble said ball spline, making maintenance easy.

In addition, the present invention is particularly useful with respect to small products that cannot normally be provided with oil grooves and oil holes in outer cylinder 72 as in the present embodiment since grease can be supplied without having to disassemble that portion.

Continuing, the following describes various other constitutions added to said ball spline along with each of their effects.

First, an explanation is provided with respect to end seal 78.

As was previously described, said end seal 78 is composed of highly rigid, plate-shaped core member 88, and elastic member 89 attached to said core member 88 that makes sliding contact with spline shaft 71, and lubricant injection holes are formed in said core member 88 and elastic member 89. Thus, in end seal 78, having a constitution equipped with a hard core member 88, even if the pressure of grease and so forth injected from the lubricant injection holes is attempted to be applied from the inside, said end seal 78 is able to adequately withstand that pressure without the occurrence of swelling or distortion, thus eliminating the risk of the occurrence of leakage of lubricant.

In addition, as is clear from FIGS. 8 through 10, lubricant injection holes 88g formed in the above-mentioned core member 88 have a larger diameter than lubricant injection holes 89g formed in elastic member 89. For this reason, these lubricant injection holes 88g also acts as lubricant collectors, making them suitable in terms of maintaining the balance between the amount of grease consumed and the amount of grease injected.

Next, the following provides an explanation with respect to end cap 77.

As was explained based on FIGS. 5, 6, 8 and 10, holes 77f and grooves 77g are formed in end cap 77 that act as connection holes that connect lubricant injection holes 88g and 89g of the above-mentioned end seal 78 with direction changing paths 85 of said end cap 77 itself (see FIGS. 4 through 6). These connection holes are for guiding grease that has been injected from lubricant injection holes 88g and 89g, and if at least one portion of these connection holes (holes 77f) are made to be large in diameter as in the present embodiment, they act as lubricant collectors that enables them to maintain balance between the amount of grease consumed and the amount of grease injected in the same manner as the above-mentioned lubricant injection holes 88g.

On the other hand, as shown in the drawings, grooves 77g, which are positioned between the above-mentioned holes 77f and direction changing paths 85, are formed to be narrower in diameter than said holes 77f. Thus, said grooves 77g act as so-called diaphragms, enabling grease to be injected slowly using injector 92 and the supplied grease to be received, and conversely enabling grease to rapidly return from direction changing paths 85 based on the impact caused by circulation of balls 74, to prevent leakage.

As is clear from FIGS. 5 and 8, connection holes composed of the above-mentioned holes 77f and grooves 77g are connected to the return path sides of the above-mentioned direction changing paths 85. Return paths 83 formed in outer cylinder body 78 shown in FIG. 4 have a slightly larger diameter than load bearing track grooves 82, and slight gaps are formed between these return paths 83 and balls 74 that pass through them. Accordingly, grease that has been injected through the above-mentioned holes 77f and grooves 77g enters smoothly due to the existence of these gaps.

In addition, as shown in FIG. 6, the connecting locations of the connection holes composed of the above-mentioned holes 77f and grooves 77g with respect to the above-mentioned direction changing paths 85 are shifted from center 85a of the rolling element guiding paths of said direction changing paths 85. According to this constitution, said connection holes, and more specifically the openings in said direction changing paths 85 of grooves 77g, have no risk of having a detrimental effect on the circulation of balls 74. In addition, the force that attempts to return grease to the outside produced based on the circulation of balls 74 is weakened, thus inhibiting leakage of grease that has been filled.

However, in said ball spline, there are two streaks of track grooves 71a of spline shaft 71 and rolling element circulating paths as was previously described. Corresponding to these, as is clear from FIG. 9, lubricant injection holes 88g and 89g of end seal 78 are also symmetrically provided at two locations, and arranged corresponding to each of these two streaks of rolling element circulating paths. According to this constitution, supply of grease or other lubricant is performed directly and without waste, thus resulting in greater efficiency.

Figure 11:
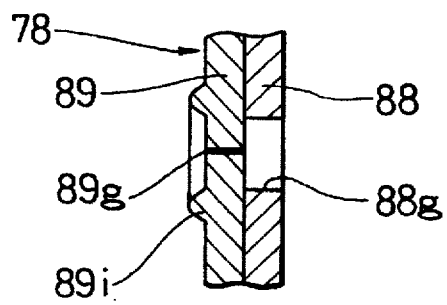
FIG. 11 is a drawing showing a variation of the lubricant injection hole shown in FIG. 10.

FIG. 11 shows a variation of end seal 78 described above.

As shown in the drawing, lubricant injection hole 89g formed in elastic member 89 is in the form of a narrow pore that can be occluded.

Namely, when nozzle 92a of injector 92 shown in FIGS. 4 and 10 is inserted, although this lubricant injection hole 89g expands due to the elasticity of elastic member 89, simultaneous to nozzle 92a being pulled out, said lubricant injection hole 89g is occluded as a result of being restored to its original shape. Accordingly, outflow of injected grease is nearly completely prevented. However, since there is concern over difficulty in visualizing lubricant injection hole 89g in the state in which it is occluded in work locations where lighting is relatively poor, the following constitution is additionally employed.

As shown in FIG. 11, ring-shaped or roughly ring-shaped projection 89i is formed as a mark so as to surround said lubricant injection hole 89g on the surface of elastic member 89. As a result, a worker can easily confirm the location of said lubricant injection hole 89g, thereby enabling injection of grease to be performed rapidly.

The shape of the above-mentioned mark is not limited to that described above, but rather marks of other shapes may also be employed. In addition, coloring may also be used for the mark. However, if the mark is provided in the form of roughly ring-shaped projection 89i as described above, said projection 89i also effectively acts as a guide for nozzle 92a when said nozzle 92a of injector 92 is inserted into lubricant injection hole 89g.

Furthermore, although the cross-sectional shape of spline shaft 71 and outer cylinder 72 is circular in the above-mentioned embodiment, it may also be square or any other cross-sectional shape.

In addition, although balls 74 are used for the rolling elements in the above-mentioned embodiment, a constitution may also be employed in which rollers are used.

In addition, although grease is used for the lubricant, oil and other lubricants can also be used without being limited to grease.

Moreover, although end seal 78 is equipped with core member 88 in the above-mentioned embodiment, an end seal may also be used that is only provided with elastic member 89 and not provided with said core member.

In addition, although the above-mentioned embodiment refers to a radial ball spline, it applies similarly to a small angular ball spline as well.

Furthermore, although a small angular ball spline has four streaks of track grooves, in this case, it is sufficient that lubricant injection holes be provided symmetrically in two locations so as to correspond to each rolling element circulating path.

As has been explained above, according to the present invention, lubricant injection hole are formed in an end seal on the end of an outer cylinder.

Thus, lubricant can be supplied directly from the end of the outer cylinder through said lubricant injection holes, and in the case of installing said linear motion rolling bearing on a bearing housing, there is no need whatsoever to perform forming for supplying lubricant on said bearing housing, thus enabling costs to be held to a low level.

In addition, since grease is supplied directly in this manner, grease supply efficiency is high and there is little possibility of the occurrence of clogging, resulting in reliable supply of grease. Even if clogging of grease was to occur, since it can be easily corrected simply by cleaning the above-mentioned lubricant injection holes, there is no need to disassemble the entire bearing, making maintenance easy.

In addition, the present invention is particularly useful with respect to small products that cannot normally be provided with oil grooves and oil holes in the outer cylinder since grease can be supplied without having to disassemble that portion.

What is claimed is:

1. A ball spline comprising:
    a track shaft having one or more tracks that extend in a longitudinal direction of said track shaft;
    a moving element that rides along said track shaft and has one or more rolling element circulating paths comprising load bearing tracks that confront respective ones of said tracks on said track shaft, return paths, and direction changing paths formed in end caps at opposite ends of said moving element, said direction changing paths communicating said load bearing tracks with said return paths;

a plurality of rolling elements arranged and contained in said rolling element circulating paths that circulate by rolling along said tracks on said track shaft accompanying relative movement of said track shaft and said moving element; and end seals provided on outer ends of said end caps, said end seals sealing gaps between said track shaft and said moving element, said end seals comprising:

a rigid core member and an elastic member attached to an outer end surface of said core member, said elastic member making sliding contact with said track shaft to seal the gaps between said track shaft and said moving element, wherein at least one of said end seals includes one or more lubricant injection holes, said lubricant injection holes extending through said rigid core member and said elastic member, wherein a diameter of said lubricant injection holes in said elastic member is smaller than a diameter of said lubricant injection holes in said rigid core member.

2. A ball spline as set forth in claim 1, wherein at least one of said lubricant injection holes in said elastic member is a narrow pore that can be occluded.

3. A ball spline as set forth in claim 1, further comprising means for identifying a location of said lubricant injection holes in said elastic member.

4. A ball spline as set forth in claim 3, wherein said means comprises a substantially ring-shaped projection surrounding one of said lubricant injection holes.

5. A ball spline as set forth in claim 1, wherein said moving element comprises an outer cylindrical body, said return paths are substantially parallel to said load bearing tracks, and said direction changing paths are substantially semi-circular, connection holes being formed in said end caps to communicate said lubricant injection holes with said direction changing paths.

6. A ball spline as set forth in claim 5, wherein said connection holes are connected on a return side of said direction changing paths.

7. A ball spline as set forth in claim 5, wherein connecting locations of said connection holes with respect to said direction changing paths are shifted from a center of rolling element guide paths of said direction changing paths.

8. A ball spline as set forth in claim 5, wherein said connection holes comprise holes that penetrate said end caps in an axial direction, and grooves that communicate with said connection holes on the inside of said end caps and with said direction changing paths by extending in a substantially circumferential direction, wherein said grooves are narrower in width than the diameter of said connection holes.

9. A ball spline as set forth in claim 1, wherein said track shaft has a plurality of said tracks and said moving element has a plurality of said rolling element circulating paths, and further comprising a plurality of said lubricant injection holes each corresponding to a respective one of said rolling element circulating paths.

10. A ball spline comprising:

a bearing housing having a retaining hole;

a track shaft having one or more tracks that extend in a longitudinal direction of said track shaft;

a moving element that rides along said track shaft and has one or more rolling element circulating paths comprising load bearing tracks that confront respective ones of said tracks on said track shaft, return paths, and direction changing paths formed in end caps at opposite ends of said moving element, said direction changing paths communicating said load bearing tracks with said return paths, said moving element being secured inside said retaining hole in said bearing housing;

a plurality of rolling elements arranged and contained in said rolling element circulating paths that circulate by rolling along said tracks on said track shaft accompanying movement of said track shaft and said moving element; and end seals provided on outer ends of said end caps, said end seals sealing gaps between said track shaft and said moving element, said end seals comprising:

a rigid core member and an elastic member attached to an outer end surface of said core member, said elastic member making sliding contact with said track shaft to seal the gaps between said track shaft and said moving element, wherein at least one of said end seals includes one or more lubricant injection holes, said lubricant injection holes extending through said rigid core member and said elastic member, wherein a diameter of said lubricant injection holes in said elastic member is smaller than a diameter of said lubricant injection holes in said rigid core member.

* * * * *